United States Patent

[11] 3,594,497

[72] Inventor Michael Graser, Jr.
Bedford, Mass.
[21] Appl. No. 794,709
[22] Filed Jan. 28, 1969
[45] Patented July 20, 1971
[73] Assignee Technical Operations, Incorporated
Burlington, Mass.

[54] COLOR TV FILM REPRODUCTION SYSTEM COMPATIBLE WITH DIFFRACTION PROCESS COLOR PROJECTION SYSTEMS
11 Claims, 21 Drawing Figs.

[52] U.S. Cl. .......... 178/5.4, 350/162 SF, 350/167, 353/20, 353/31, 353/97
[51] Int. Cl. .......... G02b 27/38, H04n 9/08
[50] Field of Search .......... 350/162; 178/5.2

[56] References Cited

UNITED STATES PATENTS 2,189,751 2/1940 Bocca et al. .......... 350/162 SF UX
3,330,908 7/1967 Good et al. .......... 350/162 SF UX
3,470,310 9/1969 Shashoua .......... 350/162 SF UX
3,504,606 4/1970 Macovski .......... 350/162 SF UX

*Primary Examiner*—John K. Corbin
*Attorney*—Rosen and Steinhilper

ABSTRACT: This disclosure depicts improved color television film reproduction systems and methods for displaying either conventional color transparency cine film, or cine records on which color separation information is stored as signals modulating separately detectable spatial carriers. The illustrated system comprises, inter alia, novel light source means for producing a plurality of highly spatially coherent light sources and a source of less coherence, and means employing the source of less coherence for establishing a wide-band luminance channel through the system. The disclosed system further includes novel spatial filtering means and methods for enabling detection of red, blue, green, and luminance information without the need for spectral filtering in either the projector or camera stages.

MICHAEL GRASER Jr.
INVENTOR

BY: ROSEN & STEINHILPER
and
JOHN H. COULT
ATTORNEYS

*MICHAEL GRASER Jr.*
INVENTOR

BY: *ROSEN & STEINHILPER*
*and*
*JOHN H. COULT*
ATTORNEYS

COLOR TV FILM REPRODUCTION SYSTEM COMPATIBLE WITH DIFFRACTION PROCESS COLOR PROJECTION SYSTEMS

CROSS-REFERENCES TO RELATED APPLICATIONS

This application relates to copending applications Ser. Nos. 682,728, filed Nov. 7, 1967; 694,174, filed Dec. 28, 1967; 697,267, filed Dec. 18, 1967 and 820,181, filed Apr. 29, 1969, all assigned to the assignee of the present invention.

BACKGROUND OF THE INVENTION

This application concerns principles useful in the application of a particular diffraction process color system to commercial color television film reproduction systems. Diffraction process color systems have been investigated sporadically for many years. Carlo Bocca in his U.S. Pat. No. 2,050,417 (1936) describes a system wherein color separation diapositives are made with spatial carriers at different angles; the diapositives are then added on a common recording medium. Color information is retrieved from the colorless record thus formed by optically Fourier transforming the record and spectrally filtering the first order diffraction patterns consonant with the color separation information they carry. The patent states that upon retransformation of the Fourier transform distribution, a full color aerial image is erected.

More recently, others have reinstigated studies of diffraction Pat. color systems, as evidenced for example, by U.S. Pat. Nos. 3,378,633 and 3,378,634 issued in Apr. of 1968 to Albert Macovski. None of the literature on the subject evidences that any of the scientists investigating diffraction process color systems have consummated the mating of a diffraction process color projector with a commercial color TV film reproduction system of the parallel monochrome type. Among the obstacles in the path of such a development have been the following: (1) diffraction process color projectors have in the past produced insufficient luminous energy to meet the minimum threshold levels of commercial vidicon pickup tubes; (2) images reproduced by prior art diffraction processes were of such marginal fidelity as to be incapable of withstanding degradation by the transfer functions of TV film reproduction systems; (3) diffraction process projectors in the prior art have not been such as to be incompatible with film reproduction systems; and (4) the relevant branch of physical optics had not been developed to a state where it was capable of supporting the advanced technology required.

The problem of the inherently low-light transmission efficiency of diffraction type projection systems used with amplitude recordings (in the order of 5 percent or less) has been treated in its broadest aspects in a copending application of Michael Graser, Jr., Ser. No. 682,728, filed on Nov. 7, 1967. The problem of low resolution and low signal-to-noise ratios in diffraction process systems is the subject of a copending application of E. Bouche and G. Parrent, Jr., Ser. No. 697,267, filed on Dec. 18, 1967. One aspect of the problem of incompatibility concerns another copending application of Michael Graser, Jr., Ser. No. 694,174, filed on Dec. 28, 1967. Each of the above-noted applications is assigned to the assignee of the present invention.

OBJECTS OF THE INVENTION

It is an object of the invention to provide apparatus and methods useful in a color television film reproduction system for reproducing with high fidelity and brightness full-color displays from a monochrome record on which color information is impressed on spatial carriers.

It is another object of this invention to provide apparatus and methods useful in a parallel monochrome color TV film reproduction system for rendering such systems compatible to the projection of conventional color transparencies or records on which color information is impressed on spatial carriers.

It is yet another object of this invention to provide a diffraction process color projector with enhanced image brightness and resolution and with minimal color distortion due to crosstalk and other effects.

It is still another object of this invention to provide, in the field of color TV film reproduction, methods and systems for interfacing a high-luminous output, high-resolution diffraction process projector with a substantially conventional parallel monochrome color TV camera chain, which methods and systems require no spectral filtering in either the projector or the camera.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1I is a schematic representation of an electronic detection and matrixing system for the FIG. 1 film reproduction system;

FIG. 1 depicts a preferred implementation of the inventive concepts. However, before describing the FIG. 1 embodiment, in order to better understand the invention and its significance, a brief discussion of the general nature of the diffraction process information storage and retrieval methods and structures with which this invention is involved, and the nature of the problems which exist in prior art display apparatus, will be first engaged.

FIG. 2 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 2 depicts the first step of a multistep operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example, by reversal processing techniques would appear as shown in FIG. 3A. The object appears inverted, of course, because of the property of the objective lens of rotating the image 180°. It is seen from FIG. 3A that the grating modulation is superimposed upon the object detail associated with light having a red spectral content. Note that because of the red constituent of yellow light, the yellow area in the object 14 is also imaged with superimposed grating lines of like angular orientation.

Figures 2, 3A, 3B, 3C, 3D, 4, 5, 6:
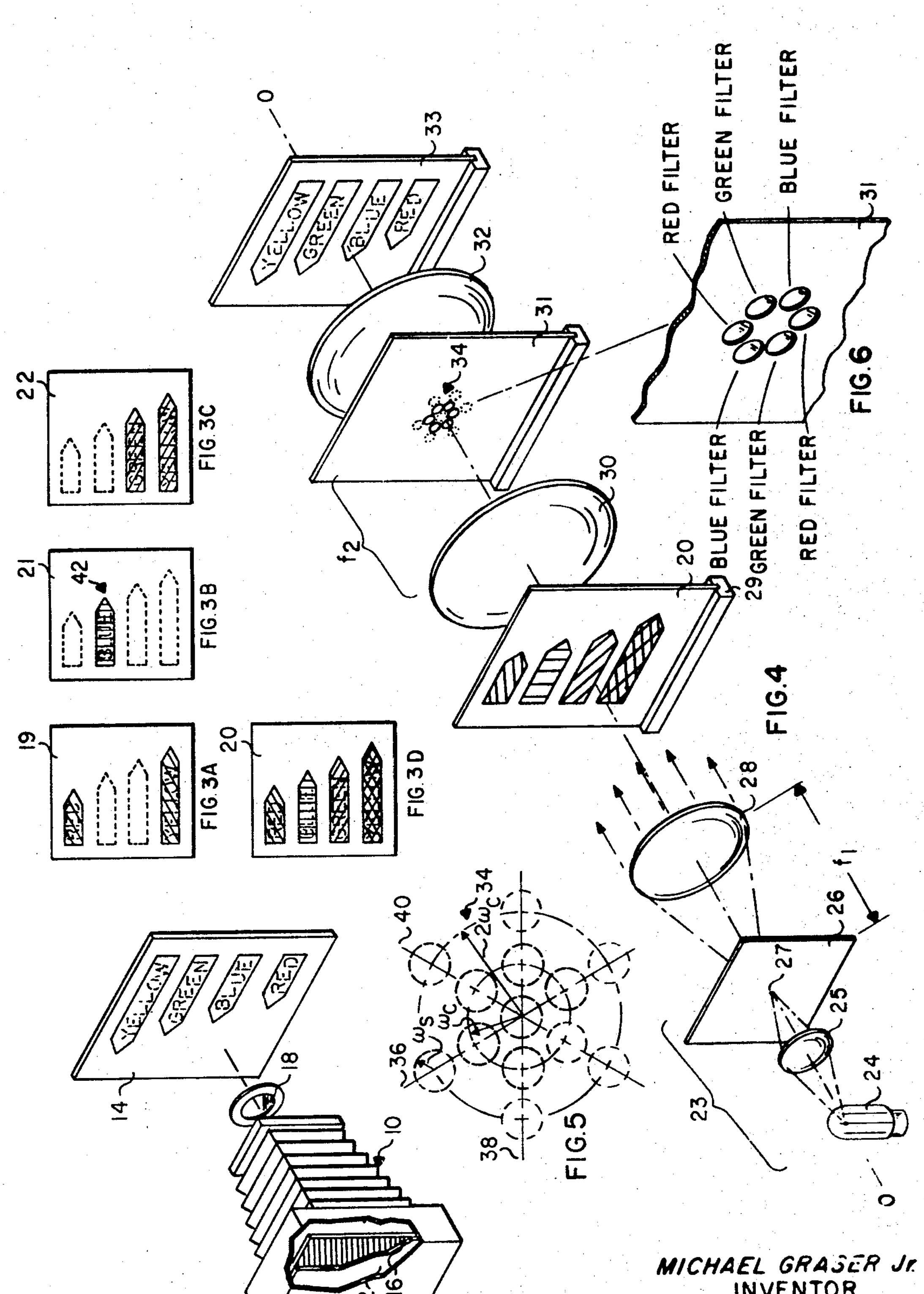
FIG. 2 is a distorted scale schematic perspective view of a colored object and photographic camera which might be used for forming photographic records of the object in accordance with diffraction process spectral zonal photography; the view shows the camera partially broken away to reveal a photographic recording material and a diffraction grating which would be otherwise hidden with the interior of the camera.
FIGS. 3A—3D show individual and composite color separation records of the object being photographed, each of the individual records being associated with a particular zone of the visible spectrum and with a periodic modulation distinctive by its relative azimuthal orientation.
FIG. 4 is a distorted scale schematic perspective view of a prior art projection display apparatus for displaying photographic records of the above-described type.
FIG. 5 is a front elevation view, schematic and grossly simplified for ease of understanding, of a Fraunhofer diffraction pattern which might be formed in a Fourier transform space in the apparatus of FIG. 4.
FIG. 6 is a schematic view, enlarged and partially broken away, of a spatial and spectral filter shown in FIG. 4.

To complete the formation of a composite photographic record, as shown in FIG. 3D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 3B that the blue color separation record 21 does not result in the exposure of any part of the film 12 not associated with blue content in the object 14; however, an exposure to the object 14 through a green filter, the yellow area is again exposed with grating image superimposed thereon with an orientation associated with the green color separation record 22. Thus, as shown in FIG. 3D, the object area having yellow spectral content has superimposed thereon spatially periodic modulations associated with both the red and green color separation records.

Apparatus for displaying such a photographic record is known to the prior art and may take the form shown in FIG. 4. Such display apparatus includes a source 23 of light which is coherent at the record at the selected modulation frequency, illustrated as comprising an arc lamp 24, a condenser lens 25, and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32, and a display screen 33 completes the display apparatus.

Upon illumination of composite record 20 in film holder 29, there will be produced three angularly displaced multiorder diffraction patterns, collectively designated by reference numeral 34 in FIG. 5. Each of the component diffraction patterns associated with a particular color separation record contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order $m$.

By the use of transform lens 30 these diffraction patterns are formed within the confines of the projection system in a space commonly known as the Fourier transform space. It is thus termed because of the spatial and temporal frequency analysis which is achieved in this plane by diffraction and interference effects. Through the use of spatial and spectral filtering of these patterns in the transform plane, one or more of the discrete color separation records may be displayed. If all three color separation records are retrieved simultaneously, for example, a reconstitution of the original scene in true color is achieved.

The nature of the Fourier transform space and the effects that may be achieved by spatial filtering alone or by spatial and spectral filtering in this space of a selected diffraction order or orders may be understood by reference to FIG. 5. FIG. 5 shows three angularly separated diffraction patterns corresponding to the red, blue, and green light object spatial frequency spectra lying along axes labeled 36, 38, and 40, respectively. Each of the axes 36, 38, and 40 is oriented orthogonally to the periodic modulation on the associated color separation record. The diffraction patterns share a common zero order but have spatially separated higher orders.

By nature of diffraction phenomena, the diffraction angle $\alpha$ is:

$$\alpha=\lambda\omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis:

$$R=f_2 m\omega_c\bar{\lambda}$$

where $f_2$ is the focal length of lens 30; $\bar{\lambda}$ is the mean wavelength of the illuminating radiation; $m$ represents the diffraction order; and $\omega_c$ is the fundamental grating frequency.

It should be understood that the FIG. 5 illustration of the diffraction patterns which might be formed is a gross simplification. In the interest of clarity and ease of understanding, the delimitation of the various diffraction orders has been represented as being circular. In reality, of course, the orders have no finite outline in transform space. The order boundaries indicated are merely isophotic lines connecting points of like energy level. In the real situation, the shape of the isophotic lines is determined by the light source shape and spectrum, the envelope of the grating elements, and the scene or object recorded.

The first orders of each of the diffraction patterns can be considered as being an object spatial frequency spectrum of maximum frequency $\omega_c$ (representing a radius of the order) convolved with a carrier of spatial frequency $\omega_c$. The second order components can be though of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 4. Since the zeroth order components of the diffraction patterns are spatially coextensive, the spatial frequencies contained in the zeroth order information channel represents the sum of the spectra respectively associated with each of the color separation records 19, 21, and 22. Thus, an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher order, because of the angular displace of the red, blue, and green associated axes 36, 38, and 40, the proper spectral characteristic may be added to each of the information channels by appropriate spectral filtering.

FIG. 6 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wave fronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31.

It is evident that by prior art methods and apparatus, the display photographic records of the above-described type is hampered by the low levels of image brightness which may be obtained. One reason for the low image luminance concerns the requirement that the effective source must not exceed a predetermined maximum size to prevent overlap, and thus "-crosstalk," between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_s$. To prevent overlap between the zeroth and higher orders, $\omega_c$ must be greater than, or at least equal to $2\omega_s$. (This may be thought of as a version of the sampling theorem.) Since each diffraction order is an image of the illuminated aperture 27 in mask 26 magnified by the ratio $f_2/f_1$, it follows then that the diameter $d$ of the aperture 27 in mask 26, and thus the total light flux transmissible through the aperture 27, is constrained in accordance with the relationship (assuming collimated light at the film gate 29); $d=f_1\lambda\omega_c$ where $f_1$ represents the focal length of lens 28, and $\lambda$ and $\omega_c$ are as indicated above.

The illuminance of the film gate by the collimator is $$E=\frac{Bd^2}{4f_1^2}\pi$$

where $B$ is the source photometric brightness (luminance) in candles/cm². Substituting for $d$ from above $$E=\frac{\pi B\bar{\lambda}^2\omega_c^2}{4}$$

This relation clearly illustrates that an increase in the brightness of displayed images can be obtained by previous techniques only at the cost of increasing the source brightness $B$ or the grating frequency $\omega_c$.

Figure 7:
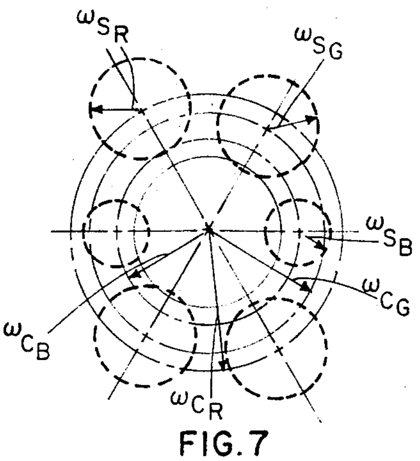
FIG. 7 is an enlarged view of a Fraunhofer diffraction pattern, showing more accurately than in FIG. 5, the relative geometry of the diffraction orders associated with the red, blue, and green color separation information.

As suggested, the schematic representation in FIG. 5 of the diffraction pattern of the record spatial frequencies formed in transform space is vastly simplified. FIG. 7 more accurately represents the diffraction pattern which would be formed. It will be understood that because of the dependence of the diffraction angle on both spatial frequency and the wavelength of the illuminating radiation, the radial displacement in transform space from the pattern axis of carrier frequencies is different for each illuminating wavelength. Thus, the spectrum of spatial frequencies in the record diffracted by the long wavelength illuminating radiation will be centered about a spatial carrier spaced farther from the diffraction pattern axis than the record spatial frequency spectrum carried on a spatial carrier produced by shorter wavelength radiation.

Also, as shown in FIG. 7, again because of the dependence of the diffraction angle on the wavelength of the illuminating radiation, the diameter of the diffraction orders for a given value of $\omega_s$ is dependent on the wavelength of the illuminating radiation.

It has been found that the bandwidth of record spatial frequencies available for retrieval actually is substantially greater than would be dictated by the sampling theorem; namely, a bandwidth of frequencies exceeding one-half of the spatial frequency of the sampling modulation. It is seen from a study of FIG. 7, however, that the bandwidth of spatial frequencies which may be detected by prior art spatial filtering techniques is appreciably less than one-half the sampling modulation frequency. There are a number of reasons for this. First, structural limitations are imposed on the spatial filter if the filter is to be formed, for example, by a photoetching process; a supporting web must be left between the openings passing the selected diffraction orders. An interstitial area between the orders is also necessary to allow for the spherical and longitudinal chromatic aberrations produced by the transform lens (lens 30 in the FIG. 4 system). Thus, the maximum bandwidth of spatial frequencies which may be detected by prior art techniques without introducing crosstalk is considerably less than one-half the spatial frequency of the sampling modulation impressed upon the record.

DESCRIPTION OF THE PREFERRED EMBODIMENTS

Figures 1, 1A, 1B, 1C, 1D, 1E, 1F, 1G, 1H:
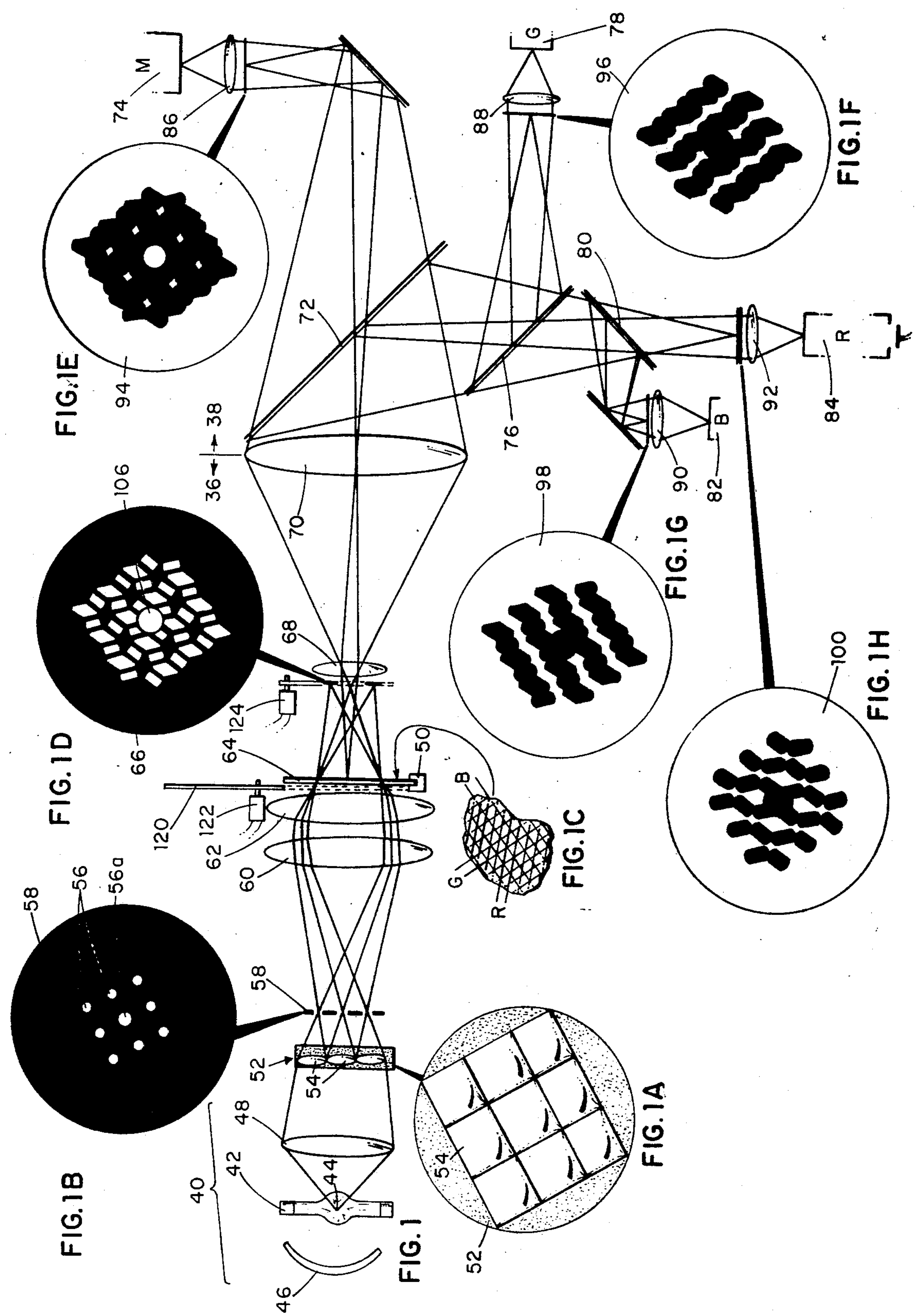
FIG. 1 is a schematic side elevation view of a parallel monochrome color TV film reproduction system which may be constructed in accordance with the teachings of the invention.
FIG. 1A is a front elevation view of a rectangular array of condensing lenses shown in side elevation in FIG. 1.
FIG. 1B is a front elevation view of an apertured mask comprising part of light source means shown in FIG. 1.
FIG. 1C is a front elevation fragmentary view of a hypothetical monochrome record containing color separation information modulating azimuthally distinct spatial carriers.
FIG. 1D is a front elevation view illustrating a spatial filter located in a Fourier transform space established within the FIG. 1 optical projection system.
FIG. 1E, 1F, 1G, and 1H represent front elevation views of light blocking masks for filtering light transmitted to monochrome, green, blue, and red detecting vidicon tubes, respectively, as taught by this invention. Each of FIGS. 1A—1H represent views of elements as they would appear if looking toward the light source.

It is one object of this invention to provide an improved light source for a projector capable of being used to feed a multiple vidicon color TV camera. In FIG. 1 the projector stage of the film reproduction system is designated by reference numeral 36 and the camera stage by reference numeral 38. In accordance with this invention light source means are provided which include a plurality of sources of spatially coherent light for establishing a plurality of diffracted color channels in combination with a source of less coherent light for establishing a luminance channel through the system, as more fully described hereinafter. To this end, light source means 40 comprises a projector lamp 42 having an arc 44 providing an intense source of luminous radiation of limited size. A spherical reflector 46 for collecting radiation from the arc 44 is disposed on the system axis and has its center of curvature at the arc 44. The reflector 46 is rotated slightly about an optical axis transverse to the system such that the image of the arc is displaced slightly from the arc itself, resulting in a substantial increase in average arc rightness.

A condensing lens 48 converges the light from the arc 44 toward the center of the film gate 50. A lenticular lens array 52 consisting (in the illustrated embodiment) of nine short focal length (for example, 7 mm.) spherical lenses arranged in a square geometry (see FIG. 1A). The lenses comprising the array 52 are illustrated as being truncated square and cemented together.

Converging light from the condensing lens 48 is received by the lenticular array 52, producing a square pattern of small arc images mating with and filling a corresponding array of pinholes 56 in mask 58 to produce nine sources of coherent light. FIG. 1B is a frontal view of mask 58. One of the pinholes 56a is intentionally made larger than the others in order to establish a source of less coherent light, for reasons to be discussed hereinafter.

The light emanating from the pinholes 56 is collected by a collimating lens 60 and a transform lens 62 which produce a converging light bundle at the film gate 50. In the illustrated embodiment wherein the film gate 50 is illuminated with converging light, the film gate is effectively illuminated by nine virtual sources in the far field of the film gate. The gate may be illuminated with collimated light to produce an exact Fourier transform of a record 64 in the film gate 50 at a Fourier transform plane in the system, however, it has been found that the use of converging light is more efficient and the consequent formation of an approximate Fourier transform produces no degradation in the reconstructed images.

The Fourier transform of the record 64 is formed in a Fourier transform space located at the back focal plane of the transform lens 62. In the illustrated embodiment the record 64 contains green information modulating a spatial carrier whose direction vector is oriented at 26° to a horizontal 0° reference (looking toward the light source), red information modulating a spatial carrier whose direction vector is oriented at 71°, and blue information modulating a carrier whose direction vector is oriented at 116° (see FIG. 1C). Thus, the diffraction spectra associated with the green, red, and blue information will be diffracted in the transform space along axes oriented at 26°, 71°, and 116°, respectively. The particular orientation of the carrier vectors and projector components as described is not a part of this invention, but is an aspect of an invention of Edmund L. Bouche, described and claimed in patent application Ser. No. 820,181, filed Apr. 29, 1969.

The arrangement of the lenticular array 52, mask 58, carriers, and lenses 60 and 62 are such that the fundamental harmonic orders carrying the red, blue, and green color separation information associated with each of the nine sources overlaps in the transform space. The overlap is such that first order red diffraction spectra produced by one source overlaps a first order red diffraction spectra produced by an adjacent source. Similarly, blue and green first order spectra are also caused to overlap in the transform space.

A spatial filter 66, shown in FIG. 1D, is effective to block the zeroth order (DC) information associated with each of the nine sources, except that produced by the central luminance channel source (for reasons to be described below), and to pass first order red, blue, and green color separation information with as little transmission of crosstalk as possible.

A projection lens 68 collects light transmitted through the spatial filter 66, forming an image of the record 64 at a field lens 70 constituting the input element for the color television camera stage 38 of the film reproduction system.

Within the TV camera stage 38 a beamsplitting mirror 72 amplitude divides the converging light bundle from the field lens 70, passing part of the beam to a high resolution monochrome vidicon tube 74 and reflecting the remaining portion of the light bundle to the color detection section of the camera. In the color detection section a first dichroic mirror 76 reflects green light to a green-detecting vidicon tube 78, transmitting blue and red light to a second dichroic mirror 80. The second dichroic mirror 80 reflects blue light to a blue-detecting vidicon 82, transmitting red light to a red-detecting vidicon tube 84. The record image formed by the projection lens 68 at the field lens 70 is reimaged onto the monochrome, green, blue, and red vidicon tubes 76, 78, 82, and 84 by lenses 86, 88, 90, and 92, respectively. For reasons which will be fully described below, the field lens is color corrected and of extraordinary quality, serving to form images of the spatial filter 66 in front of the lenses 86, 88, 90, and 92, respectively, at the locations of which images are placed novel light blocking masks 94, 96, 98, and 100, shown individually in FIGS. 1E—1H. The construction and function of these light blocking masks will be treated in some detail below.

Figure 11:
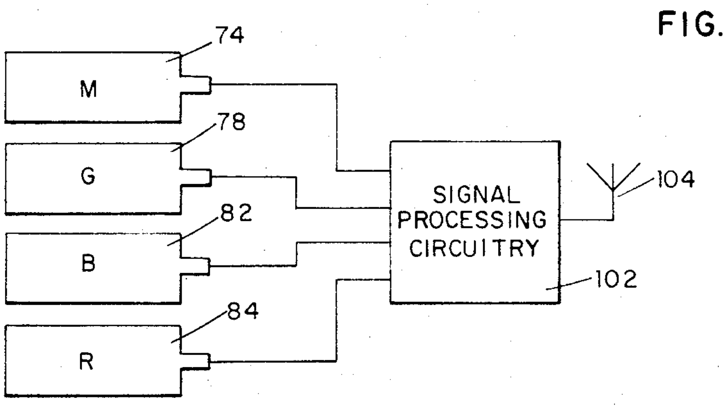

Signals generated within the vidicon tubes 74, 78, 82, and 84 are sent through leads to signal processing circuitry 102, shown in FIG. 11 in black box form for simplicity of illustration. The signal processing circuitry 102 performs the functions of amplification, matrixing, and other conventional electronic operations to develop a composite signal for transmission from antenna 104.

It is another aspect of this invention to provide a color television film reproduction system having a distinct luminance information channel carrying a wideband of spatial frequencies available for processing in the camera chain separately from the channels associated with the color information. The provision of a wideband luminance channel enables the production of images of greater resolution, enhanced brightness, and higher signal-to-noise ratios than is possible if color channels alone are combined to produce luminance information.

It has been found that the use of a light source with high spatial coherence produces images having a random noise effect, appearing as a speckling on the displayed images. This speckling effect is a result of random amplitude and phase perturbations of the illuminating wave fronts due, inter alia, to random defects in the recording medium. The provision of a separate luminance channel having substantially less spatial coherence than the color channels has the advantage that the speckling effect is swamped by the addition of the more uniform luminance channel energy. In accordance with this invention a wideband luminance channel is combined in a novel and expedient arrangement with a plurality of more spatially coherent channels transmitting color information on spatial carriers. Referring now to FIG. 1 and attendant FIGS. 1B and 1C, the combination of a luminance channel with a plurality of more spatially coherent channels may be accomplished by providing an intensely illuminated pinhole **56*a* of substantially larger size than pinholes 56 in mask 58. Although the location and origin of the enlarged source is to a certain extent arbitrary, in the illustrated preferred embodiment one of the pinholes 56 in mask 58** is enlarged to serve as a source of substantially less coherent light for the luminance channel.

There are a number of factors which influence the decision as to which of the pinholes 56 shall be selected to provide the enlarged source for the wideband channel—among these are: sacrifice of color energy caused by necessary spatial filtering in the transform plane, utilization of the optimum modulation transfer functions of the system optical elements, and symmetry in the luminance and color channels. For the present application the desirability of maintaining an optimum net modulation transfer function (MTF) and minimizing vignetting leads to the selection of the central pinhole as the one which should be enlarged to provide the source for the luminance channel. FIG. 1B shows the enlarged central pinhole **56*a* in mask 58 implementing this choice. In the transform plane spatial filter 66 (see FIG. 1D) is provided with a large central aperture 106 for passing a bandwidth of spatial frequencies substantially greater than the bandwidth of any of the diffracted color channels transmitted through the array of apertures surrounding the central aperture 106**.

Figure 8:
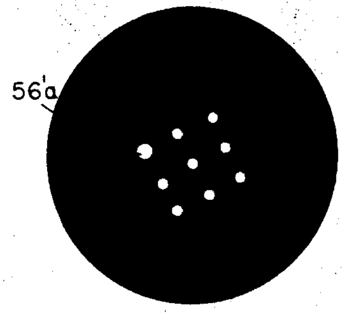
FIG. 8 depicts an alternative embodiment of a light source mask for use in the FIG. 1 film reproduction system.
Figure 9:
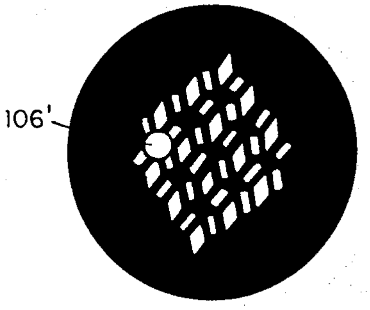
FIG. 9 is a spatial filter for location in the Fourier transform space established within the FIG. 1 projection system which is useful with the alternative light source mask shown in FIG. 8.

The preferred incorporation of a luminance channel into a system of more coherent color channels has been depicted. In an alternative embodiment of the invention wherein maximized transmission of color channel energy is sought at the expense of symmetry and MTF, an enlarged pinhole **56*a*′ may be located in one of the peripheral pinholes, preferably at a corner location, as shown in FIG. 8. With a source geometry as shown in FIG. 8, the spatial filter 66 must be modified accordingly to take the form shown in FIG. 9. It is evident that the enlarged aperture 106′** for passing the wideband luminous channel energy, because of its corner location, does not require the sacrifice of as much color channel energy as is the case when the aperture is located on axis.

In the preferred embodiment of the inventive concepts, means are provided for rendering unnecessary any spectral filtering at the Fourier transform plane, as is required in the prior art systems (see especially FIG. 6), and for obviating the need for dichroic mirrors in the camera chain. The illustrated film reproduction system exploits the fact that the field lens 70 forms an image of the spatial filter 66 in front of each of the vidicons. By blocking with blocking masks 94, 96, 98, and 100 different portions of each of the filter images thus formed, each vidicon is caused to "see" only the color separation (or luminance) distribution which it is assigned to detect. FIGS. 1F, 1G, and 1H depict blocking masks 96, 98, and 100 designed for blocking all energy except the green color separation image, the blue color separation image, and the red color separation image, respectively. A comparison of the blocking masks 96, 98, and 100 with the spatial filter 66 will clearly indicate the manner in which the opaque mask patterns respectively absorb substantially all energy except that which defines the distribution which the associated vidicion is assigned to detect. The opaque mask patterns on the blocking masks represent partial images of the spatial filter 66 which are slightly enlarged in order to: (1) more effectively block crosstalk energy which would otherwise be transmitted, (2) allow for lens imperfections, and (3) introduce some mechanical and alignment tolerances.

A similar blocking mask 94 (see FIG. 1E) blocks all color channel energy and transmits only the zeroth order luminance channel distribution to the monochrome vidicon tube 74. Whereas it may at first impression appear that zeroth order color channel energy will be transmitted through clear areas on each of the blocking masks, it must be remembered that the spatial filter 66 prevents all zeroth order color channel energy from passing beyond the Fourier transform space.

The blocking masks may be fabricated in any of a great number of ways—one satisfactory method involves deposition of opaque patterns on a clear glass base material.

Thus, it becomes evident that although dichroic mirrors 76 and 80 as found in conventional parallel monochrome color television cameras may be utilized, they are rendered unnecessary by the use of blocking masks 94, 96, 98, and 100 and may be replaced by conventional beamsplitting mirrors.

It is an object of this invention to provide a compatible color TV film reproduction system which is capable of being used to reproduce images in color from either conventional color transparency records or monochrome records on which color separation information is carried on spatial carriers. By the utilization of blocking masks 94, 96, 98, and 100, which during projection of a conventional color transparency subtract only a small amount of energy which would otherwise reach the respective vidicon tubes, no alteration of the camera stage is necessary to convert from color transparency projection to diffraction process projection of monochrome records.

However, in the film projector, it is desirable to illuminate the film gate with diffuse incoherent light when color transparencies are projected. To this end FIG. 1 shows a diffuser 120 mounted for rotation into or out of the system by a rotary solenoid 122. The system is shown in its operative mode for reproducing color images by diffraction process from a monochrome record. Thus, the diffuser 120 is shown in its inoperative position. The only other modification to the system to convert from one mode of operation to the other concerns the spatial filter 66. The spatial filter 66 is useful only in connection with diffraction process projection and would block a substantial amount of light if used during projection of conventional color transparencies. Thus, means are provided for alternately positioning the filter 66 either within or without the system depending on whether conventional or diffraction process projection is desired. Innumerable ways of implementing this alternate positioning of the filter 66 may be devised; FIG. 1 shows in a simple schematic illustration, a rotary solenoid 124 for controlling the position of the filter 66.

Thus, when it is desired to switch from the diffraction process projection mode, as shown in FIG. 1, to the conventional mode, the only conversion that is necessary is to effect withdrawal of the filter 66 from the system and effect insertion of the diffuser 120 into the system by appropriately actuating solenoids 122 and 124. To convert back to diffraction process projection, the filter 66 is reinserted into the system and the diffuser 120 withdrawn.

The invention is not limited to the particular details of construction of the embodiments depicted, and it is contemplated that various and other modifications and applications will occur to those skilled in the art. Certain changes my be made in the above-described process without departing from the true spirit and scope of the invention herein involved, and it is intended that the subject matter of the above depiction shall be interpreted as illustrative and not in a limiting sense.

I claim:

1. For use in an optical projection system for retrieving information from a record containing an imagewise signal modulating a spatial carrier, light source means for establishing a plurality of effectively far-field sources of light which is spatially coherent at the record at the frequency of said carrier, said sources being separated in a predetermined distribution with respect to a system optical axis, and an effectively far-field source of light which is substantially less spatially coherent at said record at the frequency of said carrier than the light generated by said plurality of sources, comprising:
   means for establishing a source of high-luminous energy;
   condensing lens means for collecting light from said source;
   an array of lenses in the light bundle from said condensing lens means corresponding in number to the sum of said plurality of coherent sources and said less coherent source, said array of lenses forming an array of spaced images of said source; and
   mask means located in a plane in which said source images are formed, said mask having an array of apertures of restricted size coinciding with the locations of all except one of said source images to establish said plurality of sources of more spatially coherent light, said mask also having an aperture of substantially larger size at the location of the remaining source image to establish said source of less coherent light.

2. The apparatus defined by claim 1 wherein said aperture in said mask is located on axis.

3. The apparatus defined by claim 1 wherein said aperture is located on the periphery of said array of apertures.

4. For use in an optical projection system for retrieving information from a record containing an imagewise signal modulating a spatial carrier, a system comprising:
   record support means;
   light source means comprising a plurality of effectively far-field sources of light which is spatially coherent at the record at the frequency of said carrier, said sources being separated in a predetermined distribution with respect to a system optical axis, and further comprising an effectively far-field source of light which is substantially less spatially coherent at said record at the frequency of said carrier than the light generated by said plurality of sources;
   lens means for forming in a Fourier transform space a number of diffraction patterns of a record in said record support means spaced in a distribution corresponding to said predetermined distribution, said patterns representing images of said light sources;
   spatial filter means located in said transform space for selectively passing trough spatially separated openings therein at least a portion of diffracted orders respectively associated with each of said plurality of sources of more coherent light and at least a portion of the zeroth order energy associated with said source of less coherent light.

5. The apparatus defined by claim 4 wherein said light source means comprises:
   means for establishing a source of high-luminous energy;
   condensing lens means for collecting light from said source;
   an array of lenses in the light bundle from said condensing lens means corresponding in number to the sum of said plurality of coherent sources and said less coherent source, said array of lenses forming an array of spaced images of said source; and
   mask means located in a plane in which said source images are formed, said mask means having an array of apertures of restricted dimension coinciding with the locations of all except one of said source images to establish said plurality of sources of more spatially coherent light, said mask also having an aperture of substantially larger dimension at the location of the remaining source image to establish said source of less coherent light.

6. For use in an optical system for retrieving information from a record containing an imagewise signal modulating a spatial carrier, the combination comprising:

a film gate for holding a record;

light source means providing a plurality of effectively far-field sources of light which are spatially coherent at the record at the frequency of said carrier, said sources being separated in a predetermined distribution with respect to a system optical axis;

lens means for forming in a Fourier transform space a like plurality of diffraction patterns of a record in said film gate, said patterns representing images of said light sources;

means including lens means for forming a plural number of conjugate images of said diffraction patterns;

a like plural number of spatial filter means, one at the location of each of said conjugate images, said spatial filter means each having a mutually distinct geometrically light attenuation characteristic; and lens means for retransforming the spectra transmitted by each of said spatial filter means to form discrete record images of said record having different spatial frequency content.

7. A color television film reproduction system for enabling the televising of full-color displays from a record containing three superimposed color separation images each modulating an azimuthally distinct spatial carrier, said system comprising:

a film gate for holding a record;

light source means for providing a plurality of effectively far-field sources of light which is spatially coherent at said film gate at the frequency of said carriers, said sources being separated in a predetermined distribution with respect to a system optical axis;

lens means for forming in a Fourier transform space a distribution comprising a like plurality of diffraction patterns of a record in said film gate, each of said diffraction patterns comprising three angularly separated Dirac delta function arrays respectively convolved with a different color separation spectra;

mask means in said transform space defining openings located to pass a fundamental diffracted order associated with each of said Dirac delta function arrays at each of said plurality of diffraction patterns;

means including lens means for forming a plural number of conjugate images of said Fourier transform space distribution;

a like plural number of spatial filter means, one at the location of each of said conjugate images, said spatial filter means each having a geometrically different light attenuating configuration for blocking a different combination of said orders transmitted through said transform space so as to pass only information associated with only one color separation image;

lens means for retransforming said conjugate images to erect respective color separation images at distinct detection planes;

a cathode ray pickup tube at the location of each of said color separation images for forming electrical signals corresponding to the intensity distributions in the respective color separation images; and electronic matrixing means for combining said signals to form a composite signal.

8. A system as defined by claim 7 wherein said system is adapted for use with records on which the said spatial carriers have a relative orientation of 0°, 45°, and 90°, wherein said predetermined distribution of said sources is generally rectangular and wherein said light attenuating configuration of said spatial filter means is such that information associated with a first and second color separation information is transmitted through respective first and second spatial filter means in directional patterns orthogonally related to each other, and third color separation information is transmitted through a third spatial filter means in a directional pattern oriented at 45° relative to said orthogonally related patterns.

9. A color television film reproduction system for enabling the televising of full-color displays from a record containing three superimposed color separation images each modulating an azimuthally distinct spatial carrier, said system comprising:

a film gate for holding a record;

light source means for providing a plurality of effectively far-field sources of light which is spatially coherent at said film gate at the frequency of said carriers and a larger effectively far-field source of light which is less coherent at said film gate than the light generated by said plurality of sources, said sources being separated in a predetermined distribution with respect to a system optical axis;

lens means for forming in a Fourier transform space a distribution comprising a plurality of diffraction patterns of a record in said film gate, said patterns representing images of said light sources, each of said diffraction patterns comprising three angularly separated Dirac delta function arrays respectively convolved with a different color separation spectra;

mask means in said transform space defining color channel openings located to pass a fundamental diffracted order associated with each of said Dirac delta function arrays at each of said plurality of diffraction patterns, said mask means further defining an opening larger than said color channel openings located to pass at least a portion of the zeroth order associated with said less coherent source to establish a wideband luminance channel through the system;

means including lens means for forming four conjugate images of said Fourier transform space distribution;

four spatial filter means, one at the location of each of said conjugate images, said spatial filter means each having a geometrically different light attenuating configuration for blocking a different combination of said orders transmitted through said transform space, three of said spatial filter means passing only information associated with a different color separation image—the fourth passing luminance information associated with said wideband luminance channel;

lens means for retransforming said conjugate images to erect three color separation images and a monochrome image at distinct detection planes;

a cathode ray pickup tube at the location of each of said color separation and monochrome images for forming electrical signals corresponding to the intensity distributions in the respective color separation and monochrome images; and electronic matrixing means for combining said signals to form a composite signal.

10. A compatible color television film reproduction system for enabling the televising of full-color displays from either a conventional color transparency record or a record containing three superimposed color separation images each modulating an azimuthally distinct spatial carrier, said system comprising:

a film gate for holding a record;

light source means for providing a plurality of effectively far-field sources of light which are spatially coherent at the record at the frequency of said carrier, said sources being separated in a predetermined distribution with respect to a system optical axis;

lens means for forming in a Fourier transform space a distribution comprising a like plurality of diffraction patterns of a record in said film gate, said patterns representing images of said light sources, each of said diffraction patterns comprising three angularly separated Dirac delta function arrays respectively convolved with a different color separation spectra;

mask means for insertion in said transform space defining openings located to pass a fundamental diffracted order associated with each of said Dirac delta function arrays at each of said plurality of diffraction patterns;

means including lens means for forming a plural number of conjugate images of said Fourier transform space distribution;

a like plural number of spatial filter means, one at the location of each of said conjugate images, said spatial filter means each having a geometrically different light attenuating configuration for blocking a different combination of said orders transmitted through said transform space so as to pass only information associated with one color separation;

lens means for retransforming said conjugate images for erecting respective color separation images at distinct detection planes;

a cathode ray pickup tube at each of said color separation images for forming electrical signals corresponding to the intensity distributions in the respective color separation images;

electronic matrixing means for combining said signals to form a composite signal;

diffuser means for insertion in said system between said light source means and said film gate;

means for supporting said diffuser means and said mask means such that each is capable of being positioned in said system to the exclusion of the other, whereby said diffuser means may be inserted in said system and said mask means may be inserted in said system and said mask means removed therefrom when it is desired to project a conventional color transparency, and whereby said mask means may be inserted in said system and said diffuser means removed therefrom when it is desired to project a record on which color information modulates a spatial carrier.

11. A method for retrieving information recorded as either a conventional color transparency or a record on which color separation information is stored as a signal modulating spatial carrier, comprising:

illuminating the selected record with a plurality of separated effectively far-field sources of light which is spatially coherent at the record at the frequency of said carrier;

forming in a Fourier transform space a number of diffraction patterns of the record representing images of said light sources;

locating a spatial filter in said transform space to selectively pass through said transform space at least a portion of a diffracted order associated with each of said diffraction patterns;

retransforming said diffraction patterns to form an image of said record at an output plane;

inserting a diffuser between said light sources and the record and removing said spatial filter from said transform space when it is desired to retrieve information from a conventional color transparency; and inserting said spatial filter in said transform space and removing said diffuser from the optical path when it is desired to retrieve information from a record upon which color separation information is stored as a signal modulating a spatial carrier.